United States Patent
Truong

(10) Patent No.: US 7,325,040 B2
(45) Date of Patent: Jan. 29, 2008

(54) LOCALLY OPERATED DESKTOP ENVIRONMENT FOR A REMOTE COMPUTING SYSTEM

(75) Inventor: Thanh N. Truong, Salt Lake, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 11/215,956

(22) Filed: Aug. 30, 2005

(65) Prior Publication Data

US 2006/0048153 A1   Mar. 2, 2006

Related U.S. Application Data

(60) Provisional application No. 60/605,741, filed on Aug. 30, 2004.

(51) Int. Cl.
*G06F 15/16* (2006.01)
(52) U.S. Cl. ............... 709/217; 709/203; 709/218; 709/219; 709/250
(58) Field of Classification Search ............... 709/203, 709/217, 227, 228, 229, 219, 223, 226, 230
See application file for complete search history.

(56) References Cited

U.S. PATENT DOCUMENTS

| | | | | |
|---|---|---|---|---|
| 5,802,304 | A | * | 9/1998 | Stone ............... 709/228 |
| 6,285,363 | B1 | | 9/2001 | Mairs et al. |
| 6,353,446 | B1 | | 3/2002 | Vaughn et al. |
| 6,546,002 | B1 | * | 4/2003 | Kim ............... 370/351 |
| 6,725,238 | B1 | | 4/2004 | Auvenshine |
| 6,742,015 | B1 | | 5/2004 | Bowman-Amuah |
| 6,772,178 | B2 | | 8/2004 | Mandal et al. |
| 6,813,768 | B1 | * | 11/2004 | Cragun ............... 709/217 |
| 6,950,991 | B2 | * | 9/2005 | Bloomfield et al. ......... 709/227 |
| 7,068,680 | B1 | * | 6/2006 | Kaltenmark et al. ......... 709/203 |
| 7,130,891 | B2 | * | 10/2006 | Bernardin et al. .......... 709/218 |
| 2003/0005178 | A1 | * | 1/2003 | Hemsath ............... 709/229 |
| 2004/0225711 | A1 | * | 11/2004 | Burnett et al. ............... 709/201 |
| 2004/0255289 | A1 | * | 12/2004 | Bethlehem et al. .......... 717/174 |
| 2005/0044251 | A1 | * | 2/2005 | Bozak et al. ............... 709/230 |
| 2005/0050183 | A1 | * | 3/2005 | Hansen et al. ............... 709/223 |
| 2005/0165912 | A1 | * | 7/2005 | Colbeck et al. ............... 709/219 |
| 2006/0294238 | A1 | * | 12/2006 | Naik et al. ............... 709/226 |

OTHER PUBLICATIONS

Foster, Ian et al. "The Anatomy of the Grid Enabling Scalable Virtual Organizations" Intl J. supercomputer Applications, 2001, pp. 1-25.

\* cited by examiner

*Primary Examiner*—Quang N. Nguyen
(74) *Attorney, Agent, or Firm*—Thorpe North & Western LLP

(57) ABSTRACT

A system and method is provided for a remote desktop environment for a grid enabled system. The system can include a grid enabled server capable of being connected into a grid network. A client computer can be in communication with the grid enabled server. A user desktop environment can be provided for the client computer, and the user desktop environment can securely connect to the grid enabled server, a grid computing network, and map to client computer operating system resources. In addition, a file manager can be in communication with the user desktop environment. The file manager may be configured to allow users to own and directly access user accounts and directories on the grid enabled server.

20 Claims, 15 Drawing Sheets

Open-Structure Software Architecture

LOCALLY OPERATED DESKTOP ENVIRONMENT FOR A REMOTE COMPUTING SYSTEM

CROSS-REFERENCE TO RELATED APPLICATIONS AND CLAIM OF PRIORITY

Priority of U.S. Provisional patent application Ser. No. 60/605,741 filed on Aug. 30, 2004 is claimed.

GOVERNMENT GRANT SUPPORT

This invention was made with government support under grant numbers CHE-0326027 and CTS-0112306 awarded by National Science Foundation. The Government has certain rights to this invention.

FIELD OF THE INVENTION

The present invention is a software environment, which allows a user to operate a remote grid enabled server and environment via a network connection.

BACKGROUND

With the expansion of the Internet and World-Wide-Web (or the Web), work and business environments have changed dramatically. Business has become more global and more work is moving to home offices and other locations remote from a centralized office. As a result, the need to be able to access information and resources from a remote computer system is becoming even more critical. Furthermore, for computing intensive work, a remote system is not just one computer or server, but rather a collection of computers either connected locally to a server or by a grid, such as the Terra Grid. The same is also true for data intensive work where data can be stored in distributed databases located on many computers at different locations.

There are several technologies for accessing a remote system and the Web, each has its own unique features and shortcomings. Specifically, these technologies include: 1) Web applications; 2) Remote shells; 3) Host-Guest systems.

Web applications are a technology that is generally platform independent and allows users to access information and requests for services of a remote server from a web browser. Users can connect to the web portal or server via a non-secured (http) or secured (https) connection from a web page. At the server, a web application configured as a servlet is running to listen for and provide such connections. This is often known as the client-server architecture. The web application can perform tasks that are simple, such as delivering data to the requesting user, or complicated ones that involve authentication, receiving input data from the user, sending a request to the server to run a different application, or receiving output data from the server and then delivering such data back to the user.

In this software architecture, users have a relatively thin web client that communicates directly to the web application servlet and not the server operating system (OS). Thus, the authentication process is performed by the servlet not the web server's own OS. In addition, users do not generally own accounts and directories on the server's operating system due to security constraints. However, the web application may provide web accounts and virtual directories for the end user but this is significantly different than having an account directly on the server itself.

Requests for resources on the server are done by the servlet. Furthermore, all computations are done on the server computer. In other words, all the web communications with the server are channeled through the servlet which provides the web data and protects the underlying server. Moreover, if the servlet crashes or network communication becomes unavailable, the user side application will immediately fail and/or the objects and pages for the web application will not be available. These types of failures are disturbing for the end users and illustrate that network connectivity is a weak link in web applications.

An example of this system is illustrated in FIG. 1. User A and B connect to the web portal and both are authenticated as registered users. User A supplies Data 1 and requests that Task 1 be executed, whereas, user B supplies Data 2 and requests Task 2. The servlet then communicates with the server OS and requests that those tasks to be performed with the supplied data. Once the tasks are completed, the server OS sends output 1 and 2 back to the servlet. At that point, the servlet assigns output 1 to user A and output 2 to user B, and then sends these outputs to the designated users.

Remote shell technology will now be discussed. The remote shell technology is generally used for servers running Unix, Linux, or similar computing environments that allow a remote shell to login to the OS. As illustrated in FIG. 2, users can open an X-window on their local desktop environments to connect directly to the server using the secure shell (SSH) protocol. In this case, the user has an account, owns directories on the server, and communicates directly with the server OS using command line commands. Users do not see the desktop environment of the server using SSH.

However, users can run an application that exports a display to the local computer from the server using the X11 forwarding protocol. The X11 protocol can "serve out" the screen, keyboard, mouse, etc. Unfortunately, the X11 protocol often has difficulties in exporting graphics from the server. In this technology, every event is executed on the server that is similar to web application technology. Stability can also be a problem because a weak link in this system is also the network connection. Because the network connection is used constantly, the entire X11 session fails when the network connection fails.

Next, a Host-Guest system will be discussed. This technology has more recently been available to personal computer (PC) users and is most often a single user application. A user can install a host application on a PC computer designated as the host and a guest application on a PC designated as the guest. Such a system has generally been restricted to running on the Window OS and is illustrated in FIG. 3.

Communication between the guest and host applications allows the host application to export the host desktop environment to the guest computer. The user at the guest computer can control the host computer via the exported host desktop environment including assessing data, running applications, etc. In a manner similar to the other technologies described, every event is done on the host computer. Note that the user does not communicate directly with the host OS but with the host-guest application running on the host computer. This system has the drawback that the host and guest applications are both installed before the system can be used. In addition, the host-guest system is highly dependent on communications network for the guest application to access the remote computer. When the network connection is unavailable, then the graphical images representing the guest acting on the host computer cannot be sent.

Sending these graphical images or remote mirroring of the guest's actions on the host consumes a significant amount of communications bandwidth.

The discussion so far has just addressed the technologies for accessing a single remote computer, not a grid computing system. In order to access a grid computing system, a user has an account and login into a computer where the account is grid enabled and have resources allocated to the user on the grid. Technologies for accessing a computing grid currently do exist, such as Globus. Thus if a server is grid enabled, the server can be a gateway to the computing grid. Unfortunately, grid computing services do not generally provide remote access capability for a user who desires to access their local server that is connected to the computing grid.

In summary, one basic feature that is common in the existing technologies described above is that all computations are performed on the remote server being used and the completed data or screens showing the actions on the remote computer are exported back to the user computer for display. In such cases, graphic data uses a large bandwidth connection.

Another common issue surrounding these existing technologies is related to network failure. When the network becomes unavailable, the remote shell and host-guest applications are terminated without any warning. Except for the web applications, these other technologies are platform dependent. Even though the web applications are somewhat platform independent, web application users access the server they are interacting with through web application servlet and do not access the server operating environment directly.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1:
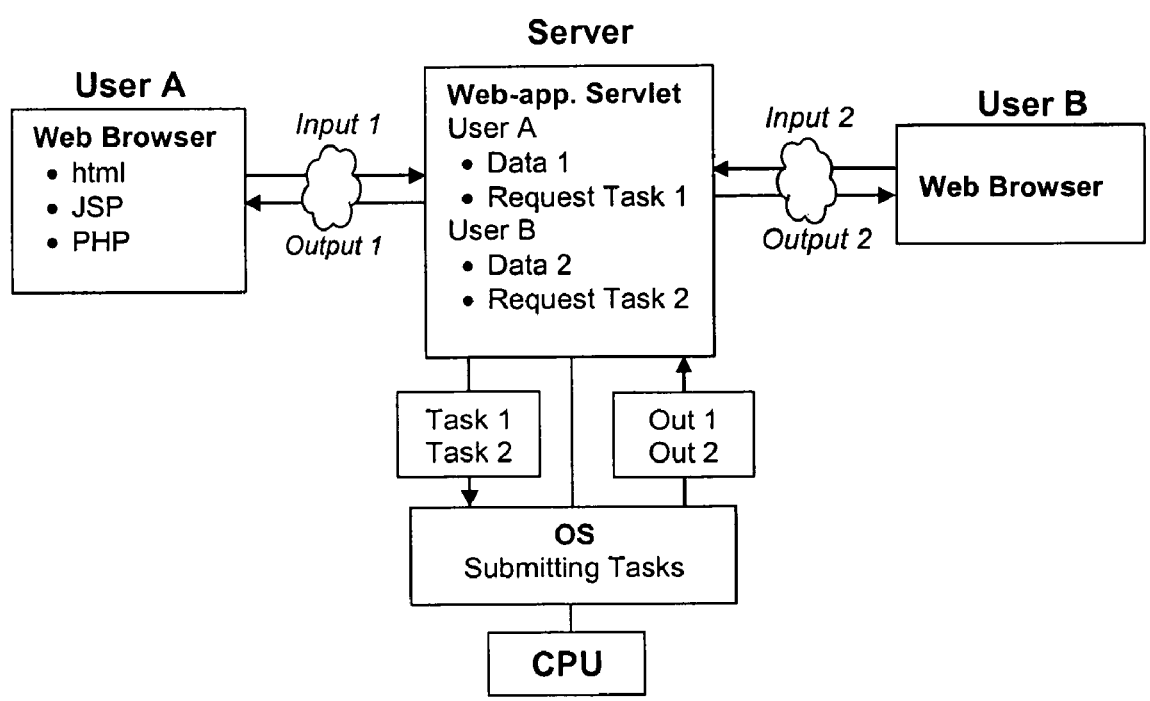
FIG. 1 is a block diagram of the software architecture of a prior art typical web application.
Figure 2:
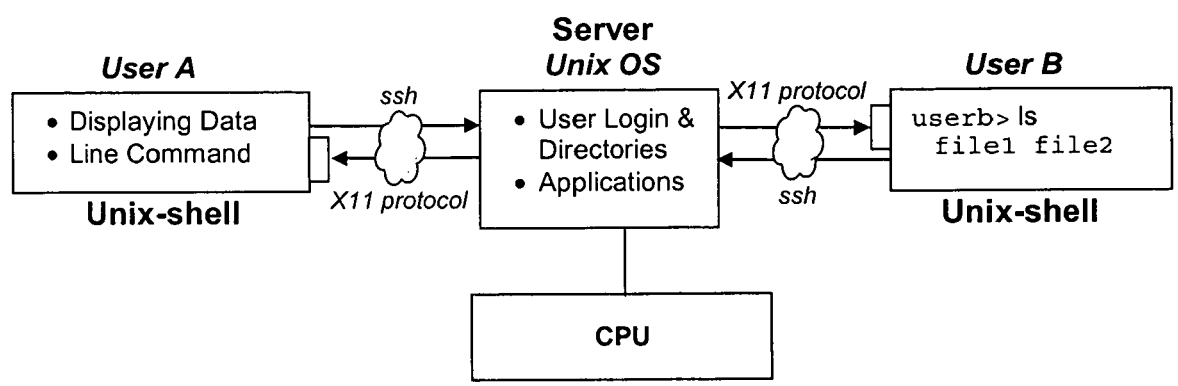
FIG. 2 is a block diagram of the software architecture of a prior art remote Unix shell.
Figure 3:
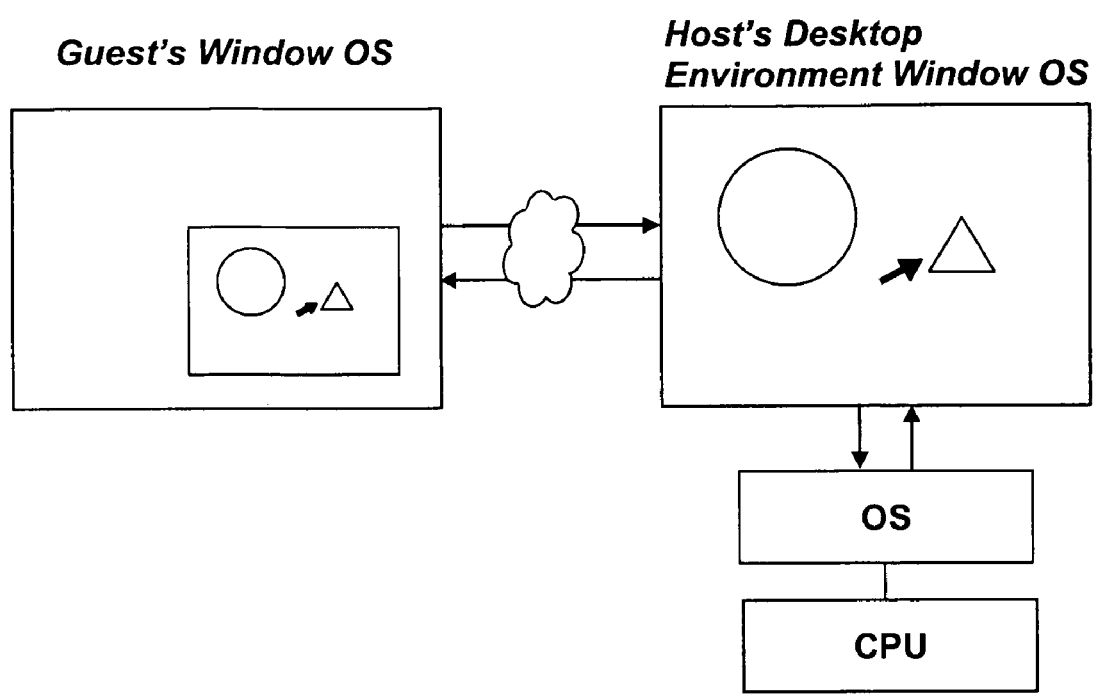
FIG. 3 is a block diagram of the software architecture of a host-guest system.
Figure 4:
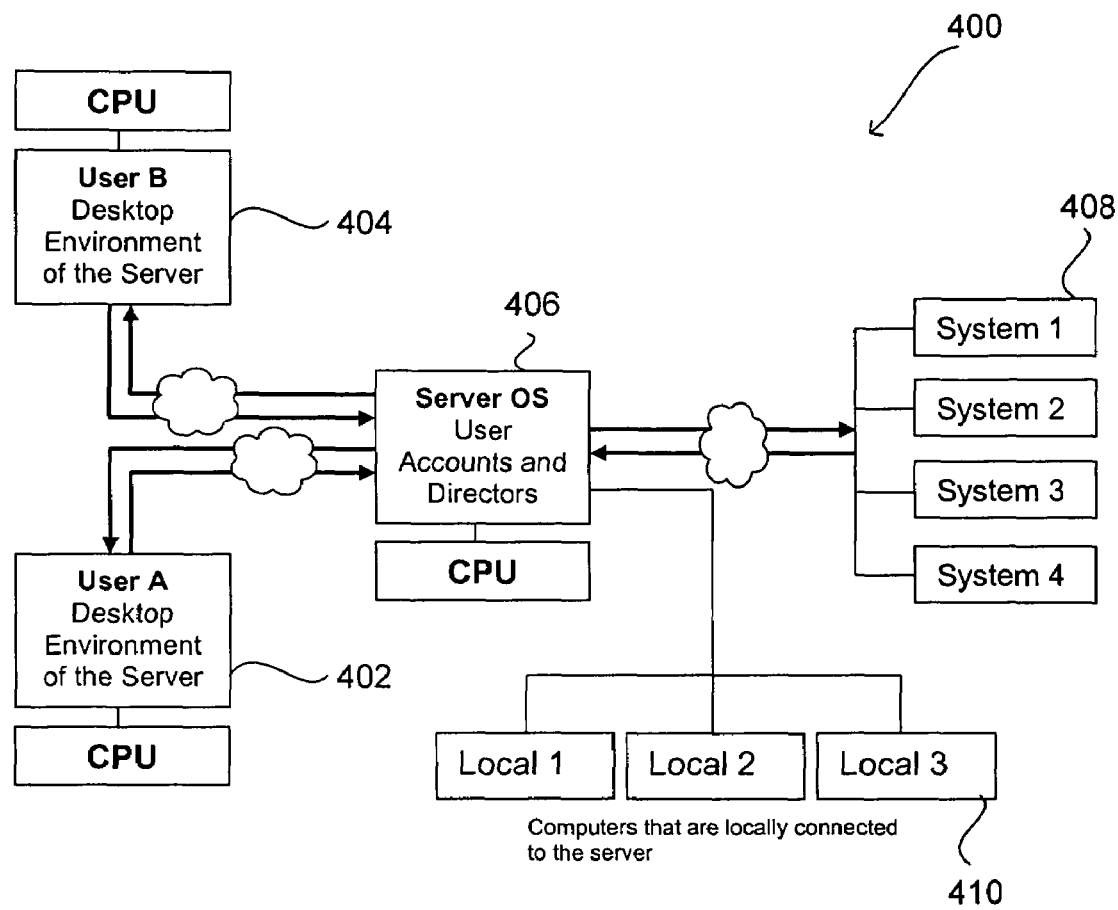
FIG. 4 is a block diagram illustrating an embodiment of a locally operated desktop environment for a remote computing grid system.

The present invention includes a desktop environment for a remote grid enabled server and the remote desktop environment can be run on a local computer using any operating system platform. FIG. 4 illustrates an overview of the entire system 400 where users A 402 and B 404 are located at physically separate locations and may use different computer platforms or operating systems to run the desktop environment for the remote server (which is at separate location from the users). The communication between user's desktop environment and the server 406 may be achieved by using the secure shell SSH technology. One example of SSH is Java SSH. Alternatively, other known networking protocols can be used to communicate between the user's desktop environment.

The server can be grid enabled and configured to communicate to all the grid computers 408 that are on the computing grid via a grid technology such as Globus. The server can also be locally connected to a number of computing nodes 410 for computing intensive applications. In this sense, the grid enabled server 406 is a gateway to the grid computing system or to computing resources contained within a local area network (LAN) or wide area network (WAN). There are no restrictions on the operating system of the server in terms of communication with the remote desktop environment or the number of desktop environments that may be connected to the server. For illustrative purposes, a Unix operating system can be used as the server's platform.

Figure 5:
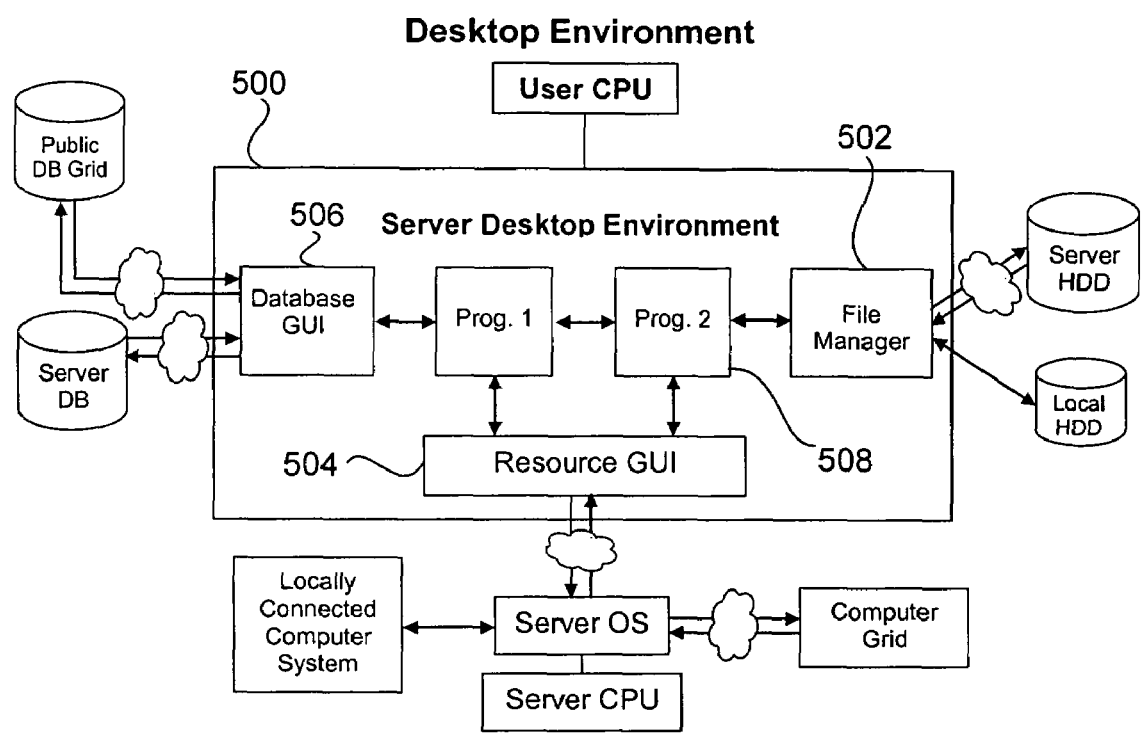
FIG. 5 is a block diagram illustrating an embodiment of the desktop environment and its main components, namely the database graphic user interface (GUI), Resource Manager, File Manager, and Software Linking Interface.

The desktop environment 500 has five main components as illustrated in FIG. 5. In particular, these are the File Manager 502, Resource Manager 504, Database Graphic User Interface (GUI) 506, Utilities (not shown), and Application GUI's with Software Linking Interfaces 508. The entire environment may be written in Java so it is platform independent and executed on the local computer. Alternatively, the desktop environment can be written as an ActiveX application or a TCP/IP enabled executable.

The File Manager allows a user to manage files on the server or on the local computer when the user has not connected to any server and provides a simple interface for transferring files between the server and the local computer. The Database GUI provides a user-friendly interface for querying, mining, and managing data from databases on the remote servers. The Resource Manager is a GUI that allows a user to access information on available computing resources on the computing grid as well as on any networked computer from which the user has received allocated resources. The Utilities component from which the user to perform normal computing work as if he/she is sitting at the server such as a notepad for simple text editor, an image viewer, graphic tools, spreadsheet, 3D visualization tools, communication tools, etc. The application GUI's and Software Linking Interfaces (SLI) are a collection of GUI's or applications that are specific to certain areas of work residing on the server and the SLIs are filters that interconnect the applications. These application GUI's and SLI can be used for construction of a workflow that connects these applications together.

Figure 6:
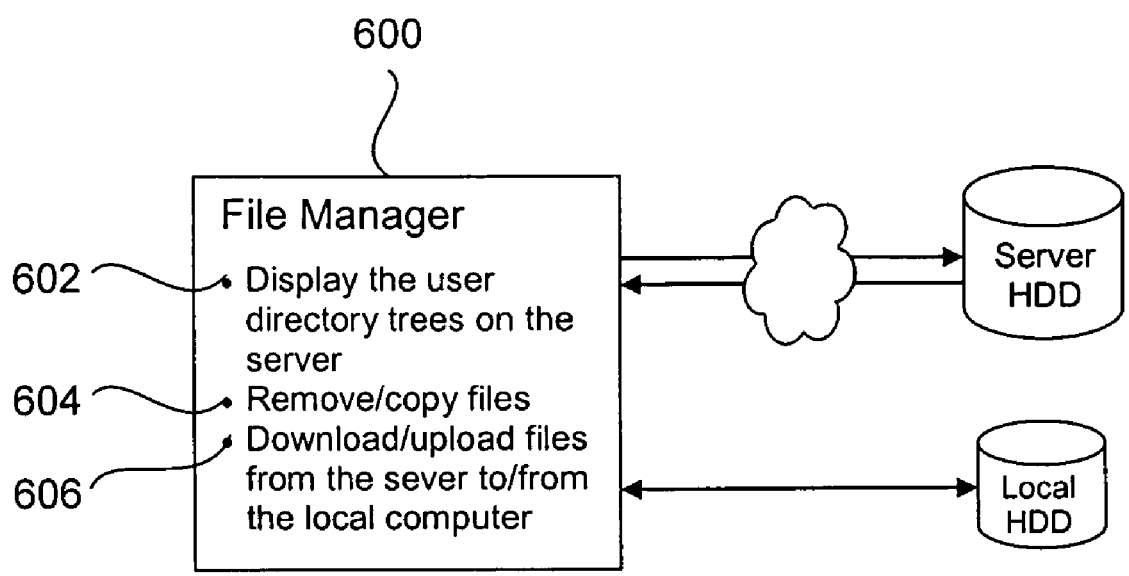
FIG. 6 is a block diagram illustrating an embodiment the architecture and functionality of the File Manager.

File Manager: The File Manager 600 is a GUI that allows a user to manage files in his/her user directories on the local computer or the remote server depending on the selected mode of operation. Its functionalities and architecture are illustrated in FIG. 6. When the environment is first activated, then the user directory trees are created as in 602. The user can delete, copy, move, and create files on the server as well as upload files from the local computer to the server and vice versa as in 604. These tasks can be done with simple click-button or drag-drop mouse functions.

The File Manager is especially valuable for a remote user because communication to the server is made only when there is a request for adding, deleting, updating, or changing the content in the user directories and data storage areas. In addition, the File Manager can periodically check the content of the user directories and update the information when it is modified due to certain application processes running on the server (or even the remote desktop environment) as in 606.

An advantage of this invention is that the communication with the server takes place when an actual file request is needed. If there is a network failure, the environment is not terminated since it runs on the local computer. However, any changes to the user directory on the server will not be made until the connection is reestablished. Reconnection to the server is done automatically when the network is available. The File Manager can cache the change and then re-sync those changes in light of any other changes that may have been made by others in the meantime. Thus, the environment is more stable with respect to network failure. When no connection to any remote server was made, the File Manager allows the user to manage files on the local computer.

Figure 7:
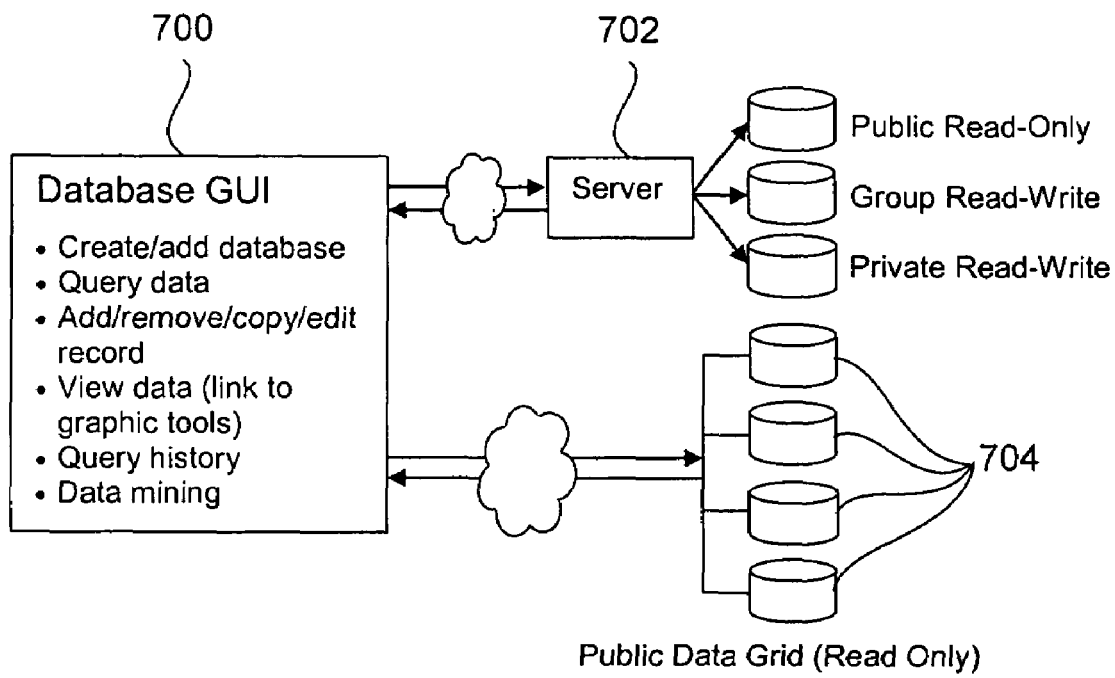
FIG. 7 is a block diagram illustrating an embodiment the architecture and functionality of the database GUI.

Database GUI: The Database GUI 700 provides a user-friendly interface for the storage of data that can be used for later querying or mining as illustrated in FIG. 7. The database GUI connects to databases accessible to the user on the server 702 as well as to those from the public data grid 704. This connection may take place using the Enterprise Java Bean (EJB) technology. This connection is independent from the SSH connection to the remote server thus it does not require the user to login onto such a server in order to access the databases that are accessible to the user.

Since users have accounts and directories on the server 702, the users can create private databases with read/write permissions, share with a designated group with read only or read/write permission, or open a public database with read-only rights. Depending on areas of application, templates for databases can be designed and then provided for user selection.

The Database GUI provides several functions. One is to query or mine data from databases. Selected data can be viewed using directly linked visualization tools available in the environment. Other functions include query history, add/delete/copy/edit record in a selected database in which the user has the write permission. The Database GUI can also provide features that allow parts of the database that have been cached in the local environment to continue to be used for viewing and manipulation if the network connection is unavailable. This caching makes the Database GUI component more usable and more stable.

Figure 8:
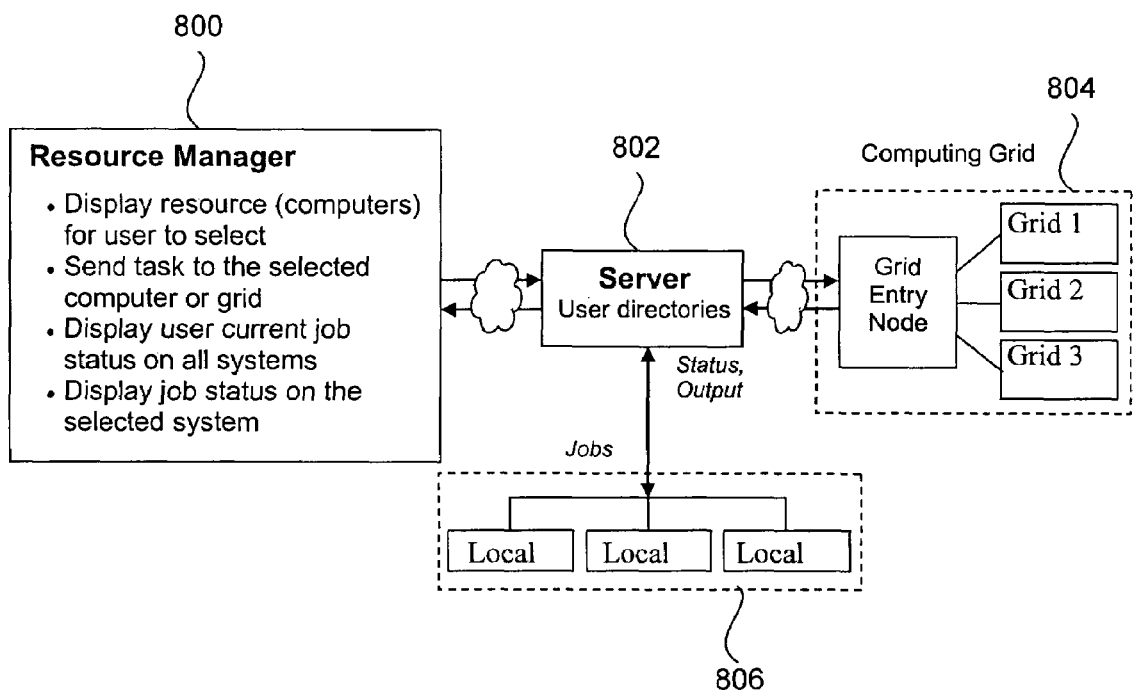
FIG. 8 is a block diagram illustrating an embodiment the architecture and functionality of the Resource Manager.

Resource Manager: The Resource Manager 800 is the GUI for a user to submit and monitor jobs on the server or other remote computers as illustrated on FIG. 8. Since the server 802 can be grid enabled, the user can also access computers available on the grid 804 in addition to all the remote computers on which the user has service allocations. When the user requests to submit a job from any application, the Resource Manager is activated. It displays all computers that are accessible to the user for selection. By default the job is run on the logon server.

Once a server is selected, the Resource Manager submits the job and provides the user with a confirmation that the job is submitted. In addition, the user can request a display of job statuses on selected computers 806. Although the jobs can be run elsewhere, the outputs are sent back to the server.

The Resource Manager is a valuable component of this environment, and it provides the user with a straightforward way to access remote computing grid resources 804 even from a computer that is not grid enabled. Since the resource scheduler is part of the desktop, this allows resource scheduling to be performed even when the network is not available. Then when the network becomes available again, the scheduled jobs can be sent to the server for processing. In this way, a user can have access to computing grid resources from any computer that has the remote desktop environment loaded.

Software Linking Interface (SLI): The Software Linking Interface (SLI) 900 is another valuable component of this desktop environment. Most of the computationally intensive applications that exist are developed independently and are not designed for interfacing with each other even if they are mutually dependent. This is especially true of scientific computing applications. For example, some of the results from one application may be used as input for another application. At the present time, a user has to perform such conversion tasks manually.

Figure 9:
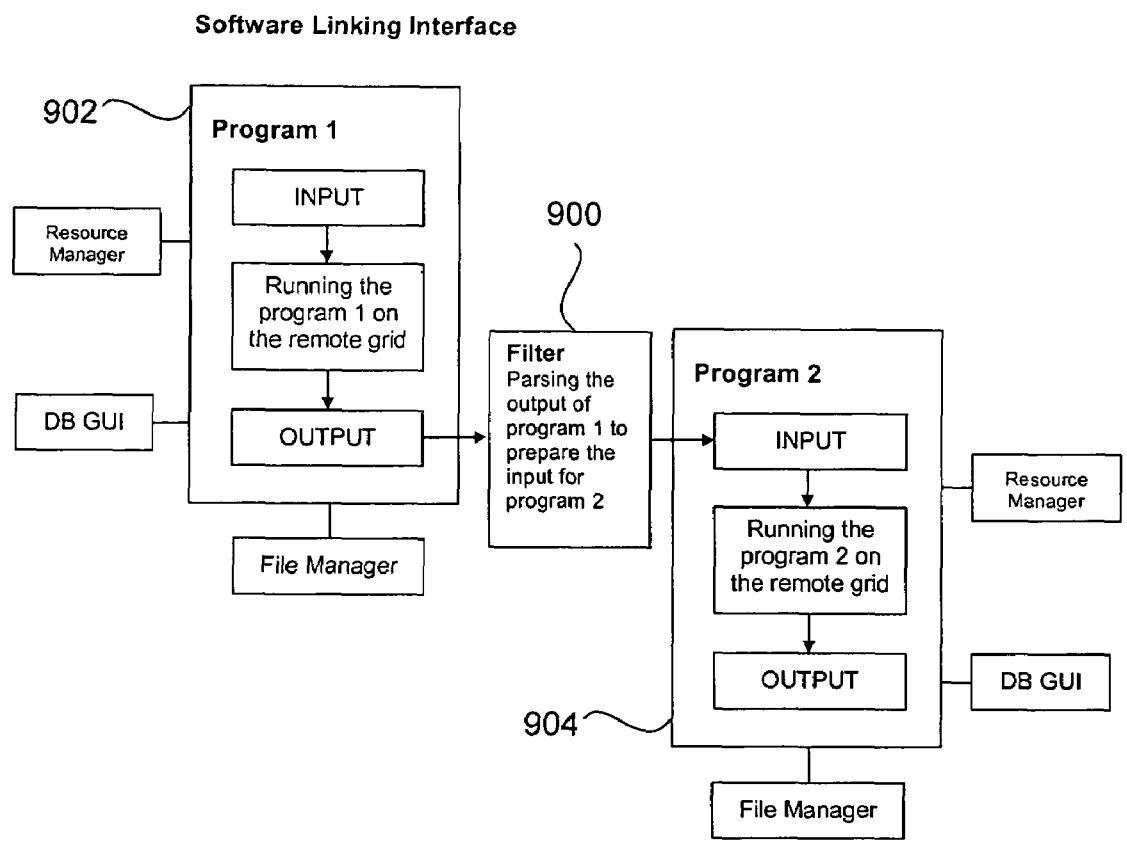
FIG. 9 is a block diagram illustrating an embodiment of an embodiment the architecture and functionality of a Software Linking Interface.

By recognizing the interdependency between two applications, SLI 900 can be designed to parse the output of one application 902 and prepare the input for the other application 904 with the correct format specifications as illustrated in FIG. 9. The use of SLI can eliminate much of the human error found in the current common practice of converting the data using human input. In addition, the SLI is valuable because it allows the end user to map one scientific computation application to another separate application. Alternatively, this mapping can be performed programmatically for scientific computing applications which have been programmed into the SLI. For instance, a workflow system can be setup to construct and monitor information flow from one application to the other via these SLI's.

Figure 10:
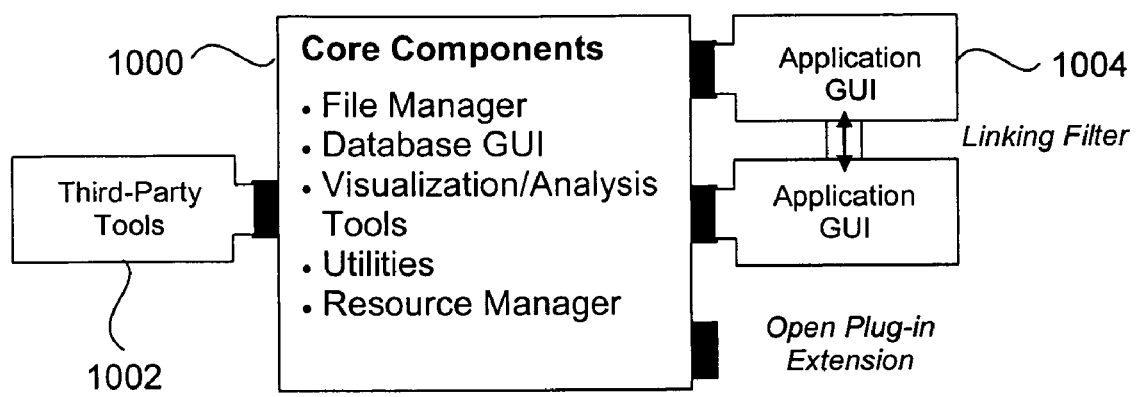
FIG. 10 is a block diagram illustrating an embodiment of the open-structure software architecture of the desktop environment.

Another useful element of this remote desktop environment 1000 is its open-structure software architecture. As illustrated in FIG. 10, the remote desktop environment allows independent developers to add new components into the desktop environment using open plug-in extensions. In this way, third-party application tools 1002 can be integrated into this desktop environment easily without the need to reveal or distribute the source code of the remote desktop environment. Furthermore, the software architecture allows a user to treat each application 1004 independently (i.e. having its own executable file). Loading third-party applications or any application into the environment can be done at run time using the Java Webstart technology or another web plug-in technology. This allows user to select applications to be loaded into the environment, and thus allows the user to customize the environment for his/her own work. This capability allows the environment to support unlimited applications while the memory required to run the environment only depends on the number of applications selected by the user.

As discussed, the desktop environment 1000 comes with a set of core components, namely the File Manager, Database GUI, Resource Manager, Visualization/Analysis tools, and Utilities. In addition, Visualization/Analysis tools and Utilities applications are provided. These tools and utilities can be written in Java (or Java OPGL in the case of 3D graphics) for execution on the local computer. These applications, such as Notepad, Plotter, Spreadsheet, Image Viewer, and 3D-Viewer, are needed for performing typical tasks on the server. Again, new tools can be added to any component by independent developers to improve the overall environment.

Figure 15:
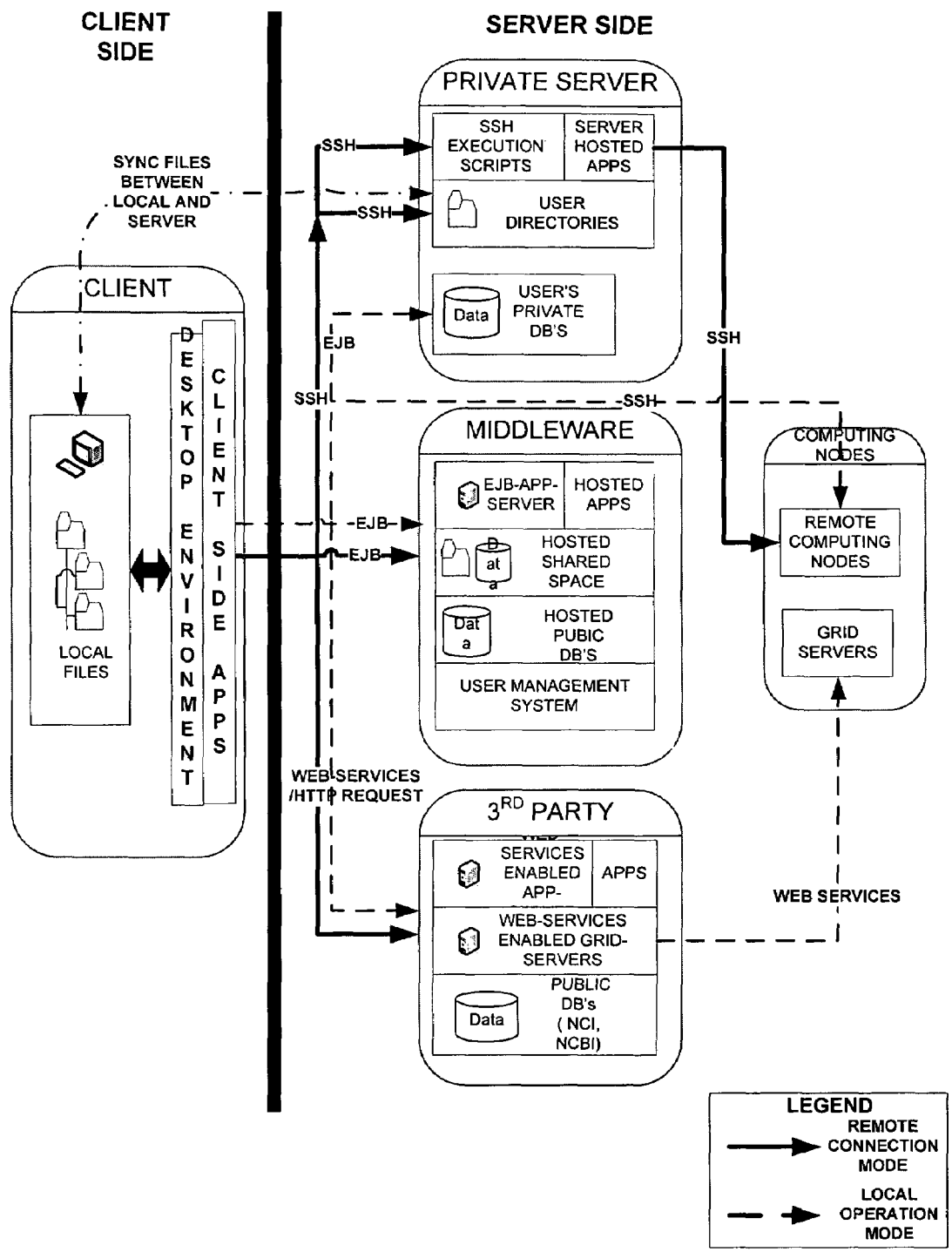
FIG. 15 is a block diagram illustrating another embodiment of the remote desktop system.

The remote desktop environment has multiple operating modes. FIG. 15 illustrates a block diagram of the invention that shows a configuration for multiple operating modes and an additional implementation configuration. There are at least three different operating modes depending on the location of data and the availability of a network or internet connection. Specifically, these operating modes are: 1) Remote server connection mode; 2) Local operating mode; and 3) Off-line mode. In all cases, the remote desktop environment is running on the local CPU or client operating system and hardware. The differences in these modes are focused generally on the methods for mapping, accessing, or retrieving the data and computational resources.

In the Remote Server Connection (RSC) mode, the remote desktop environment allows users to connect to any server specified by the user. In most instances, a grid enabled server will be connected to by the user. The environment can map to the user file directories for the selected server and allow the user to run any application on that server for which he/she has the proper license or permissions. The environment is stable with regard to network interruptions. In other words, the environment remains operating when the internet or network connection is unavailable.

When the environment is in the local operating mode, the user can select not to connect to any remote server or grid enabled server. This means that the user will not use data and files from the grid enabled server. In such cases, the environment works from the local disk or storage medium. The File Manager, in this case, maps all accessible devices on the user local computer such as the local hard disk, CDROM, Floppy, USB memory stick, etc. Users in this case can use all Java-based applications within the environment, accessing (private, shared, or public) databases using EJB/http/ or web-services technologies.

In the local operating mode, users can also submit jobs to a remote server or grid enabled server using SSH connection. Processing jobs can also be submitted to a Globus enabled computing grid using the cog-toolkit provided by the Globus technologies that is based on the web-services technology. Network access to network server databases and web-enabled libraries is available in the local operating mode. Other networked resources may be available that do not use a mapping to a remote server.

Another option is the off-line mode. In the event that the Internet or network is not available, the environment can be used as an application operating on the local computer that can read/write data to the memory devices available on the local computer. In the off-line mode, the remote desktop environment will be stable and jobs or other information may be queued up pending the availability of the network.

One overall benefit of the present system is that this system can take a plurality of application tools that independently communicate with disparate network systems and combine the applications to form a cohesive remote desktop system that operates transparently to the user. More specifically, the remote desktop combines the mapping and data retrieval for several environments to allow the user to see just one environment. As described, the remote desktop allows users to access a 1) grid enabled server, 2) a grid computing network; 3) local client computer hardware and software, and 4) local applications with local data.

The present embodiments described are also significantly different than prior remote interface systems because it includes an integrated environment that acts as single application even though it is formed from many integrated applications. This functionality is enabled because the remote desktop interface provides the filtering and communication channels for inter-application communication. In addition, the core of the remote desktop interface is configured to allow many software tools to be plugged into it. These plug-in software tools may be integrated with multiple classes of systems, such as 1) grid enabled servers, 2) grid computing systems, 3) web enabled applications, and 4) a local client's operating system.

Because of the high level of integration between the components of the present embodiment that communicate with the network data and computing sources, all of remote data that is requested by end user comes into the environment seamlessly and without additional user requests. When all the data the user has accessed gets pulled into this environment, then the information can be passed seamlessly to other applications through the local filters. This is efficient because the user can automatically move data between significantly disparate environments without having to leave the remote desktop environment. In other words, the environment makes the data transfer transparent by connecting directly to a grid server or grid computing system and storing data from these systems when the data is viewed by the user. This avoids multiple download steps and allows the system to move data between different applications in the environment transparently.

To reiterate, the present invention is a remote desktop environment, which allows a user to operate a server and a remote grid enabled server via a secured network connection. Because this software runs on the local user computer and has reduced dependence on the network using caching and reduced network requests (i.e., using the local CPU), the desktop environment is more stable with regard to network failure. Other features of the invention include platform independence, web accessibility, and independence from web browser types. Some of the valuable features of the software can be listed below, namely:

1. The software is running on the local CPU and the communication to and from the server is at a minimal level via a secured network which results in reduced network reliance.
2. It is user platform independent.
3. Any operating system may be used for the server.
4. It can be accessed from a web browser but is independent of the web browser types.
5. It can also be run from a copy of the executable saved on the user computer.
6. It allows users to own and directly access user accounts and directories on the server. Thus, users can access resources on the server such as running computing intensive application tools that cannot be accessed on the local computer.
7. It is stable with regards to network failure. In particular, the software continues to operate on the local computer while attempting automatically to re-establish a connection in the case of network interruption.
8. It also allows users to query and mine data from databases residing on the server and the data grid.
9. If the server is grid enabled, it provides a gateway to the remote computing grid from the local user computer, which is not necessary grid enabled.
10. It has open-structure architecture to allow independent third-party member to develop new components or additional application tools for the software.

Figure 11:
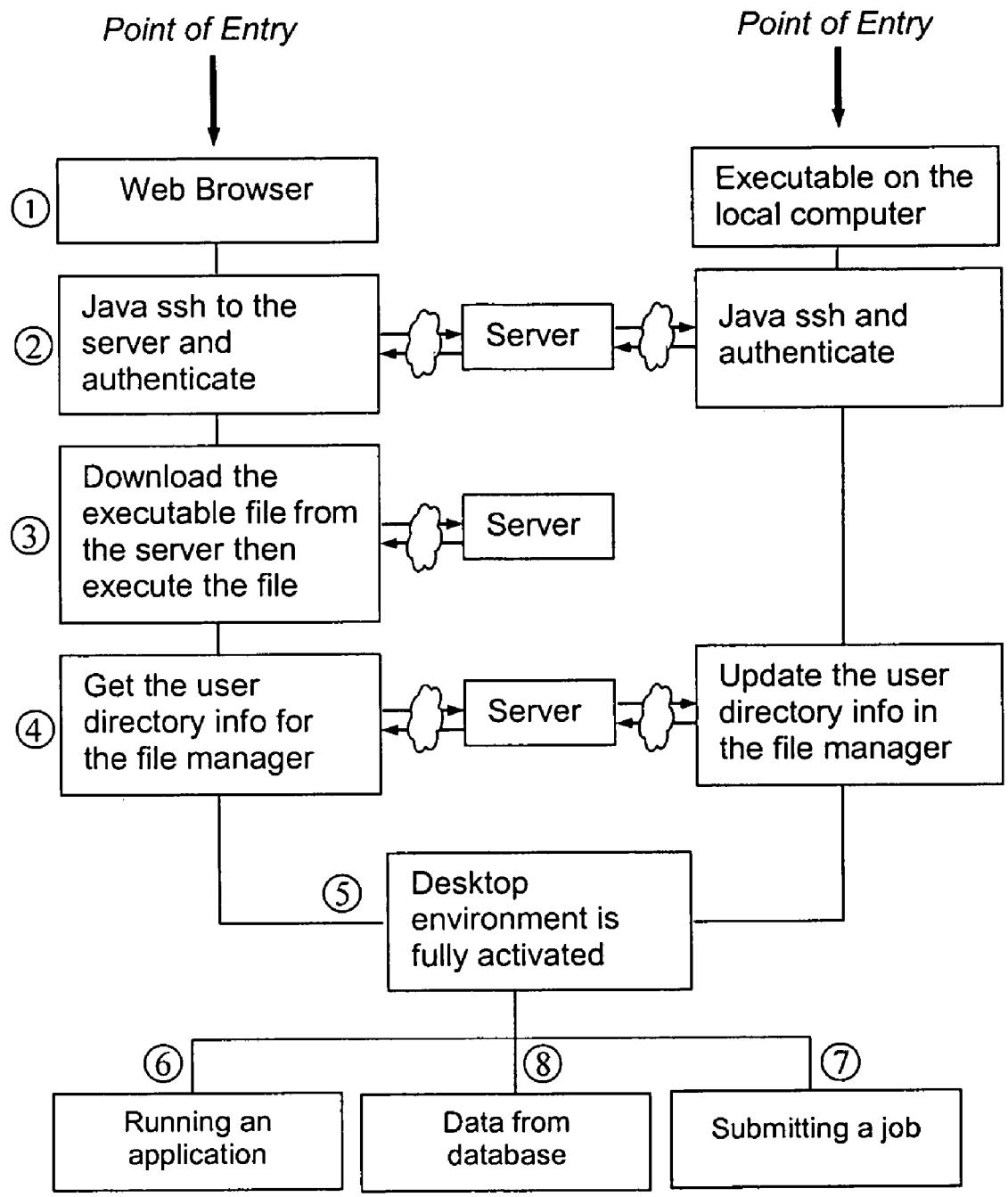
FIG. 11 is a flowchart illustrating operations for activating the desktop environment.

FIG. 11 illustrates the operational flowchart for initiating the desktop environment. There are two possible points of entry: 1) from a Web browser, and 2) from a copy of the executable file for the remote desktop that is saved on the local computer. The desktop environment is initiated by first making a connection to the server using the Java SSH technology. The user must supply a username and password on the server for authentication.

In one embodiment of secure shell (SSH), the communications are encrypted using IDEA or one of several other ciphers (three-key triple-DES, DES, RC4-128, TSS, or Blowfish). Encryption keys may be exchanged using RSA, and the data used in the key exchange is destroyed frequently. In addition, the keys are not saved anywhere. Every host may have an RSA key which can be used to authenticate the host when RSA host authentication is used. Encryption may used to protect against IP-spoofing. The public key authentication is used to protect against DNS and routing spoofing. RSA keys may also used to authenticate hosts.

Once authenticated, if the user accessed the server from a Web browser, a copy of the remote desktop environment is downloaded and then run on the local computer. The remote desktop environment can then communicate with the designated server directly using TCP/IP or another networking protocol. The user's accounts and directories can then be mapped into the remote desktop environment.

A request can then be sent to the server for user directory information. The File Manager is then updated. At this point the environment is fully activated. The user can perform one of the several typical tasks, for example: 1) running a remote or local application; 2) submitting a job; and 3) querying data from databases. Due to the architecture described above, the remote desktop environment will not crash when the tasks described above are requested, even if the network connection is not available. These network oriented tasks can be delayed until the network is available and any local tasks that can be performed may be completed before the network is available.

Being able to launch the application from a web browser and then load the application over the web provides access to the remote desktop environment and designated server from any location. As a result, the entire remote desktop environment is launched by starting the secure web connection and then the web connection is not needed. In addition, the prior art has not used web authentication to launch a remote desktop environment that can be connected to any server using an IP address.

Figure 12:
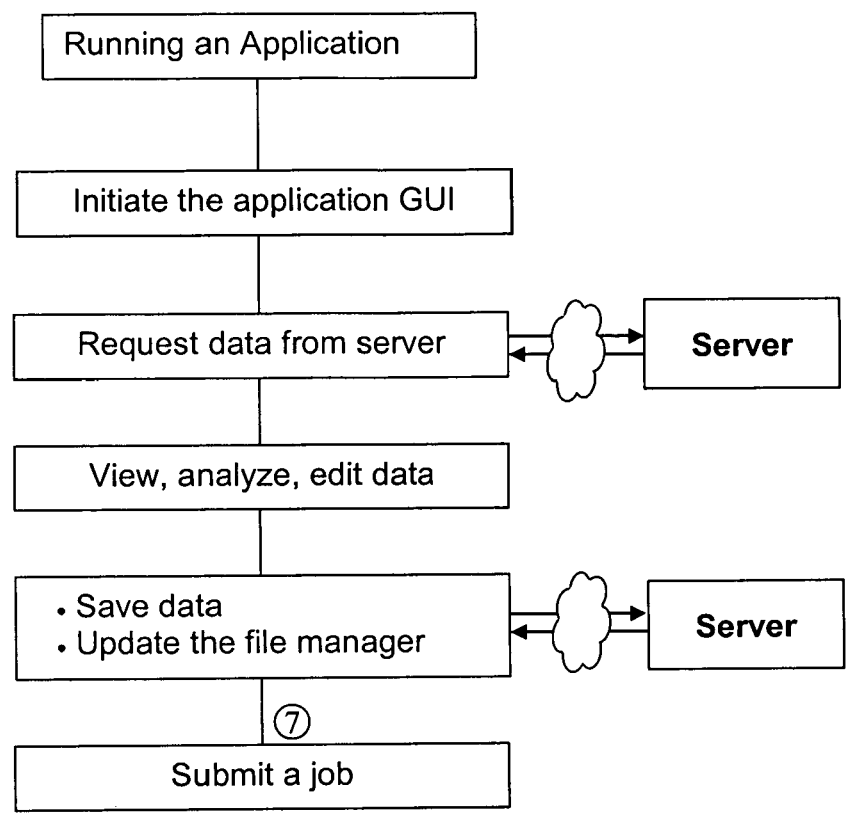
FIG. 12 is a flowchart illustrating operations for running an application in the desktop environment.

FIG. 12 shows the operational flowchart for running an application. Users can initiate the application by double clicking on the icon on the desktop. If the application requires reading a file from the server, then a request to the server is made. The user can view, analyze, and/or edit the data on the local computer using the remote desktop environment and without network communication.

Once the selected user operations are complete, the desktop environment can save the data to the server. At that point, a request is sent to the server and once this is done, the File Manager is updated. If the application is a GUI for a computationally intensive scientific application, the user can also submit a job to a remote computer. Note that communication to the server is only made when the application needs to read or save a file from/to the server that requires very little data transfer over the network. The application is operated on the local computer during the remaining operation time.

Figure 13:
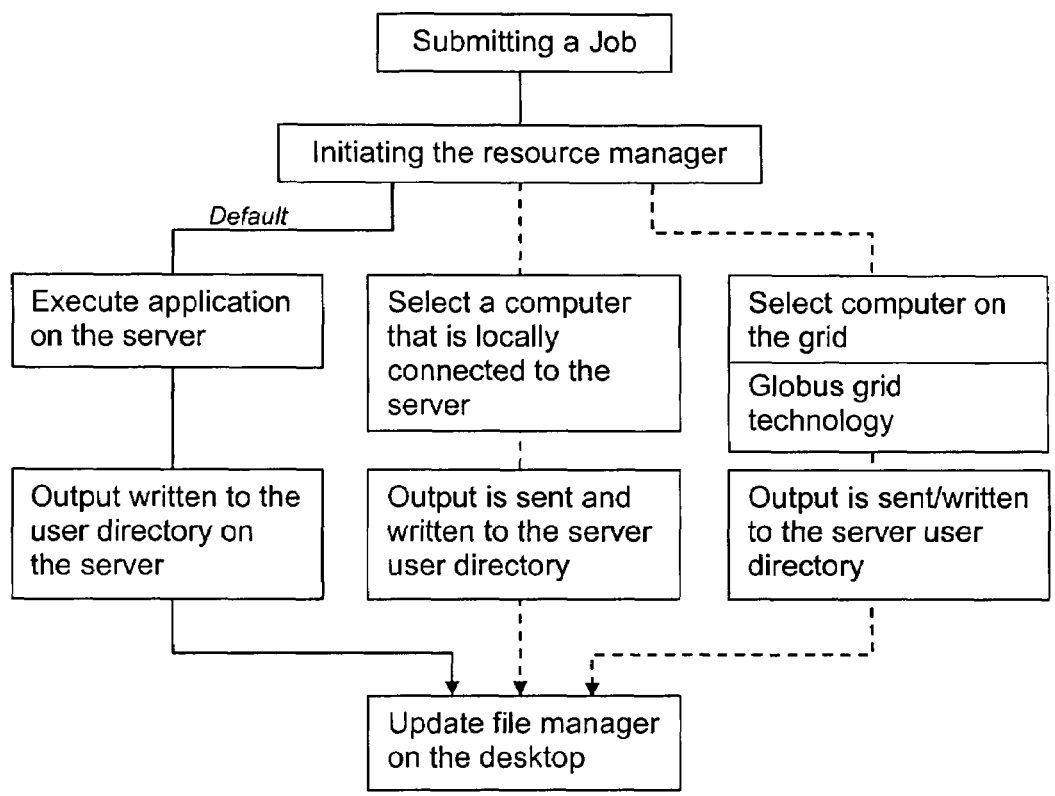
FIG. 13 is a flowchart illustrating operations for submitting a job to the server or to a remote computing grid.

When the user requests to submit a job on a remote server, the Resource Manager is initiated. As illustrated in FIG. 13, by default, the user can run the job on the server. However, the user can select any remote computer on which he/she has an account and resource allocation. Before submitting the job to a specific computer, the environment verifies that the user has an account there and the application for the job request is available. For security reasons, the environment does not store any user password, thus the user must enter a password for the selected computer for verification purposes. The verification process is done by the Java SSH connection from the server to the selected computer.

Once authenticated, the job can be submitted from the Resource Manager via the server. If a user selects the computing grid, then a different authentication process must be followed depending on the grid technology to be used. The outputs can then be sent back to the server, which in turn will notify the File Manager to update its information.

Figure 14:
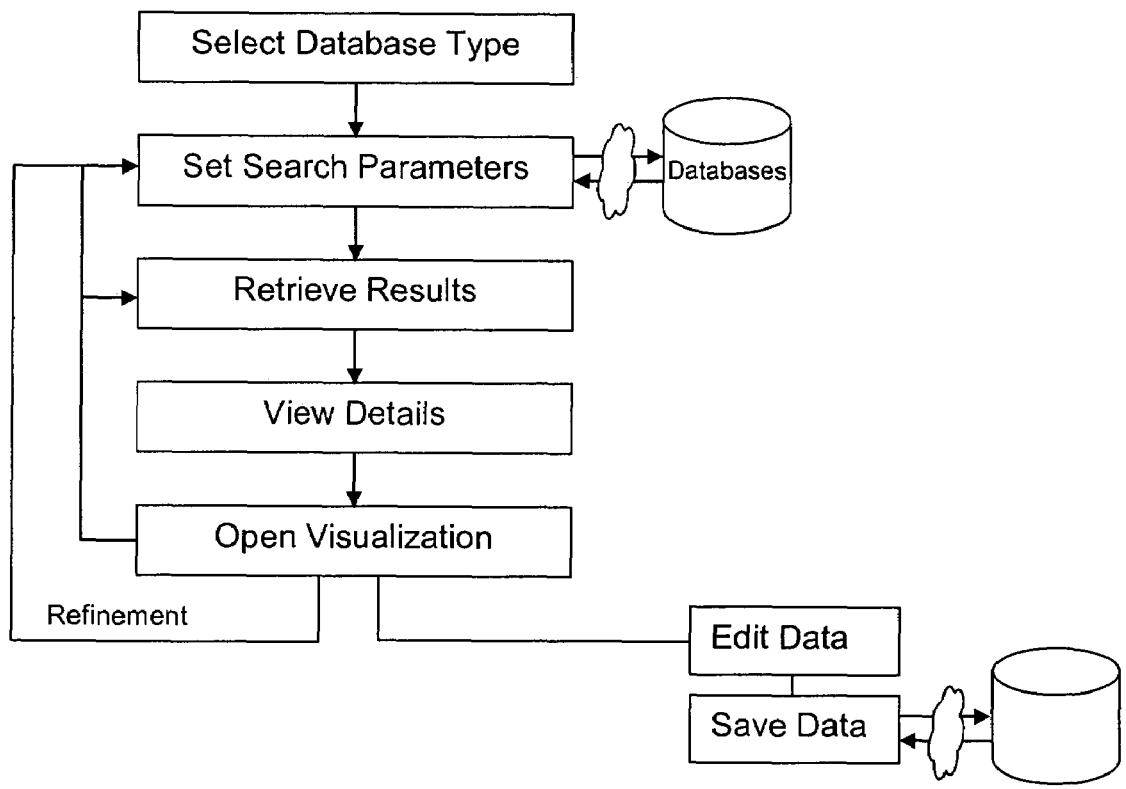
FIG. 14 is a flowchart illustrating operations for querying data from databases.

FIG. 14 illustrates another typical task, namely querying data from databases. First, a user selects databases, and a GUI for these databases is then initiated. The user can set the search parameters and then execute the search. The request is sent to the server via the Enterprise Java Bean connection. The results of the query can be retrieved to the environment for further refinement or analysis. The user can view the data by using any analysis or visualization tools available in the environment. For data that have a specific (customized) visualization tool, a direct link to such an application is made.

The user can also edit and save the data back into his/her private databases. In this case, a request for saving data is sent to the server. Similarly, communication to the server is only made when a search request is made or data is retrieved from the server or saved on the server. The analysis and visualization steps, which are computationally more demanding, are done on the local computer.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A desktop user interface embedded in a computer readable storage medium, executable by a client computer, for allowing a user to operate a remote grid enabled server in a grid enabled system via a network connection, said desktop user interface comprising:

a database graphic user interface for the client computer that is configured for accessing databases located on a user-specified server and any remote databases accessible to the user;

a resource manager for the client computer, including a resource interface being configured to enable the user to access available computing resources on the grid enabled system and any remote computer or cluster of computers;

a file manager for the client computer, the file manager being configured to enable the user to manage files on the remote grid enabled server and transparently move files from the remote grid enabled server to the client; and a software linking interface for the client computer, the software linking interface being configured to provide authoring tools for specific areas of work residing on the remote grid enabled server, wherein the software linking interface is configured to enable data transfer between applications and filter data passed between the applications, wherein the client computer is configured to remotely communicate with the remote grid enabled server via the network connection and wherein the remote grid enable server is enabled to access the grid enabled system.

2. A desktop user interface as in claim 1, wherein the software linking interface parses an output of a first scientific application to prepare the output as input for a second scientific application.

3. A desktop user interface as in claim 1, wherein the database graphic user interface further enables the user to query and manage data for the databases stored on the remote grid enabled server.

4. A desktop user interface as in claim 1, wherein the resource manager is enabled to access computing resources on any grid networked computer.

5. A desktop user interface as in claim 1, further comprising a utilities component configured to provide local applications for the user.

6. A desktop user interface as in claim 5, wherein the local applications provided for the user in the utilities component are selected from the group consisting of a simple text editor, an image viewer, graphic tools, a spreadsheet, a presentation tool, 3D visualization tools, and communication tools.

7. A desktop user interface as in claim 1, wherein the file manager communicates with the server only when there is a request for adding, deleting, updating, or changing the content in the user directories and data storage areas.

8. A desktop user interface as in claim 1, wherein the database graphic user interface can be used to create private databases, share a database with a designated group of users, and open a public database.

9. A desktop user interface as in claim 1, wherein the resource manager is configured to enable a user to submit and monitor jobs submitted to grid network computers.

10. A desktop user interface as in claim 1, wherein the resource manager is configured to display every computer and every grid computer which is accessible to the user for computing jobs.

11. A desktop user interface embedded in a computer readable storage medium, executable by a client computer, for allowing a user to operate a remote grid enabled server in a grid enabled system via a network connection, said desktop user interface comprising:

a database graphic user interface for the client computer that is configured for accessing databases located on a user-specified server and any remote databases accessible to the user;

a resource manager for the client computer, including a resource interface being configured to enable the user to access available computing resources on the grid enabled system and any remote computer or cluster of computers;

a file manager for the client computer, the file manager being configured to enable the user to manage files on the remote grid enabled server and transparently move files from the remote grid enabled server to the client; and a software linking interface for the client computer, the software linking interface being configured to provide authoring tools for specific areas of work residing on the remote grid enabled server and to parse an output of a first scientific application to prepare the output as input for a second scientific application, wherein the client computer is configured to remotely communicate with the remote grid enabled server via the network connection and wherein the remote grid enable server is enabled to access the grid enabled system.

12. A desktop user interface as in claim 11, wherein the software linking interface enables data transfer between applications and filters data passed between the applications.

13. A desktop user interface as in claim 11, wherein the database graphic user interface further enables the user to query and manage data for the databases stored on the remote grid enabled server.

14. A desktop user interface as in claim 11, wherein the resource manager is enabled to access computing resources on any grid networked computer.

15. A desktop user interface as in claim 11, further comprising a utilities component configured to provide local applications for the user.

16. A desktop user interface as in claim 15, wherein the local applications provided for the user in the utilities component are selected from the group consisting of a simple text editor, an image viewer, graphic tools, a spreadsheet, a presentation tool, 3D visualization tools, and communication tools.

17. A desktop user interface as in claim 11, wherein the file manager communicates with the server only when there is a request for adding, deleting, updating, or changing the content in the user directories and data storage areas.

18. A desktop user interface as in claim 11, wherein the database graphic user interface can be used to create private databases, share a database with a designated group of users, and open a public database.

19. A desktop user interface as in claim 11, wherein the resource manager is configured to enable a user to submit and monitor jobs submitted to grid network computers.

20. A desktop user interface as in claim 11, wherein the resource manager is configured to display every computer and every grid computer which is accessible to the user for computing jobs.

* * * * *